United States Patent [19]

Poulin

[11] Patent Number: 4,514,164
[45] Date of Patent: Apr. 30, 1985

[54] REDUCTION GEAR SYSTEM FOR TWIN SCREW EXTRUDING SYSTEM

[75] Inventor: Jean L. Poulin, Saint-Die, France

[73] Assignee: Societe dite: USINES BEYER FRERES, France

[21] Appl. No.: 582,766

[22] Filed: Feb. 23, 1984

[30] Foreign Application Priority Data

Mar. 2, 1983 [FR] France ............................. 83 03443

[51] Int. Cl.$^3$ ............................................. B29F 3/02
[52] U.S. Cl. ..................................... 425/208; 366/83
[58] Field of Search ............... 366/83, 296, 297, 300; 425/208

[56] References Cited

U.S. PATENT DOCUMENTS 3,124,061 3/1964 Studli.

FOREIGN PATENT DOCUMENTS 2025162 12/1971 Fed. Rep. of Germany.
1465784 3/1977 United Kingdom.
2032047 4/1980 United Kingdom.

*Primary Examiner*—Thomas P. Pavelko
*Attorney, Agent, or Firm*—Gerald J. Ferguson, Jr.; Joseph J. Baker

[57] ABSTRACT

In a twin screw extruding machine, a reduction gear system comprises a casing, an input shaft and two output shafts supported by said casing, each in alignment with a respective one of said screws. A respective first pinion is fitted to each output shaft, these first pinions being offset relative to one another in the axial direction. The first pinion on each of the output shafts is a helical pinion so as to develop a component of force in the axial direction opposite a reaction to the thrust exerted by the associated screw of the extruding machine. Two first helical gears mesh with the first pinion on each of said output shafts at diametrically opposite points thereon. A respective second helical pinion meshes with each first helical gear. Each of the second helical pinions is keyed to a respective thrust shaft. There is a respective thrust bearing at one end at least of each thrust shaft. A respective second helical gear is keyed to each thrust shaft. That on one thrust shaft has teeth inclined in the direction opposite that of the teeth of the second helical pinion on the same thrust shaft. The second helical gear on the other thrust shaft has teeth inclined in the same direction as the teeth on the second helical pinion on the same thrust shaft. A respective third helical pinion meshes with each second helical gear, these third helical pinions having teeth inclined in opposite directions and being mounted on a common shaft. A third gear is keyed to this common shaft. The third helical gears are adapted to be driven by the input shaft.

8 Claims, 5 Drawing Figures

REDUCTION GEAR SYSTEM FOR TWIN SCREW EXTRUDING SYSTEM

BACKGROUND OF THE INVENTION

1. Field of the Invention

The invention concerns a reduction gear system adapted to drive the screw shafts in twin screw extruding machines.

2. Description of the Prior Art

Single screw extruding machines are routinely used for extruding plastics materials and many compounds of varying complexity based on polymers, although it is well established that there are clear advantages in the use of twin screw extruding machines. In particular, the throughput of a twin screw extruding machine is substantially proportional to the screw rotation speed, whereas that of a single screw extruding machine reaches relatively rapidly a maximum value after which it descreases. Also, the power required for extrusion using a single screw machine is proportional to the square of the mass of material extruded, whereas it has a lower value for the same throughput in the case of a twin screw machine.

Twin screw extruding machines are not common, in spite of their functional superiority, because of difficulties experienced with driving them in rotation, due to the small distance separating the axes of the two screws. The torque to be transmitted is very high and the size of the pinions which can be installed in the space available provides for only one meshing. This results in high bending loads on these pinions of limited dimensions and in high reaction forces on the bearings supporting the shafts of these pinions.

It is not possible to use a single bearing capable of withstanding these reaction forces. Instead a number of needle bearings are placed side by side in the hope that the reaction forces will be equally distributed between them. However, the bending of the shaft creates irregular loads which result in premature deterioration of the bearings.

By virtue of the extrusion process the screws generate a high axial thrust which must be countered by thrust bearings which must be relatively small to fit into the space available for them, but of adequate dimensions to withstand the load during the theoretical service life of the machine.

The conventional method currently used to counter the reaction to the axial thrust of the screws consists in mounting an appropriate thrust bearing of large diameter at one end of one screw and associating with the second screw a number (up to four) of consecutive thrust bearings of small diameter, in the space available between the two screws. These successive thrust bearings comprise flexible means which it is hoped will automatically distribute the thrust between the thrust bearings in an appropriate manner. Practice shows that one of them is subject to an exaggerated thrust and deteriorates rapidly.

The principal object of the invention is to provide a reaction gear system for twin screw extruding machines with which the power which may be transmitted, and therefore the torque, may be doubled, the risk of bending may be eliminated and the load on the bearings may be reduced to zero.

It should be pointed out here that an additional constraint is involved in driving twin screw extruding machines. The screws may turn in the same direction or in opposite directions; it is therefore necessary for any reduction gear system for twin screw extruding machines to be readily adaptable to the simultaneous driving in rotation of two screws in the same direction or in opposite directions.

Another object of the invention is to provide a reduction gear system which can be readily adapted to co-rotating or counter-rotating screws, using a common casing.

SUMMARY OF THE INVENTION

In accordance with the invention, the aforementioned objects are achieved by a reduction gear system in which first and second output shafts for coupling to the screws are separated by the same distance as the axes of the screws and each is fitted with a first helical pinion, the inclination of the teeth being calculated to produce from the driving force a component of force in the axial direction opposite to the reaction to the axial thrust exerted by this screw.

These first pinions are offset relative to one another in the axial direction on the two output shafts.

From the first output shaft, each first pinion meshes at two diametrically opposite points with two first gears each axially movable on a supporting shaft and each transmitting half the power required to each of the screws.

Each first pinion is necessarily a helical pinion and meshes with a second helical pinion having its teeth inclined in the same direction as the teeth of the first pinion. Each second pinion is keyed to a respective thrust shaft which is retained in the axial direction, preferably at each end, by an appropriate thrust bearing, required to withstand the axial forces generated by the helical teeth.

Also keyed to each thrust shaft is a second gear. On one of the thrust shafts this second gear has helical teeth inclined in the direction opposite to that of the teeth of the second pinion carried by the same shaft, whereas on the other thrust shaft the second gear has helical teeth inclined in the same direction as those of the second pinion which corresponds to it.

Each second gear meshes with a respective third pinion. The two third pinions are fixed to a common shaft; they necessarily have helical teeth inclined in opposite directions. To one end of this shaft is keyed a third gear which has straight teeth.

The foregoing description with reference to the first output shaft applies symmetrically to the second output shaft, so that there are two third gears.

In the case of counter-rotating screws, the two third gears are of relatively large diameter and mesh together. One of them meshes with a final drive pinion at the end of a conventional parallel shaft reducer gear train driven by a motor.

In the case of screws with the same rotation direction, the two third gears are of smaller diameter and each meshes with a common intermediate gear which meshes with the final drive pinion of the conventional reducer gear train.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
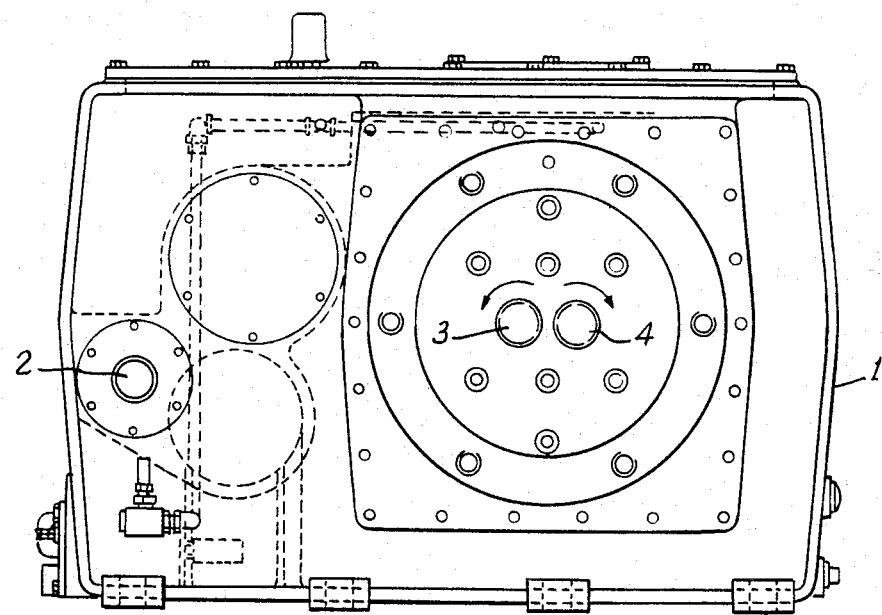
FIG. 1 is a view in elevation of a reduction gear system in accordance with the invention showing on one side of a casing the two shafts which are coupled to the counter-rotating screws of an extruding machine.

A casing 1, seen in FIG. 1, contains the gear system to be described hereinafter for transmitting torque applied by a motor to an input shaft 2 to two output shafts for coupling to the screws of a twin screw extruding machine (not shown), namely a first shaft 3 and a second shaft 4.

The first output shaft 3 and the second output shaft 4 are fitted with respective first pinions 5; these two pinions 5 are offset in the axial direction. From the first pinion 5 on each output shaft 3, 4 there extends symmetrical fashion a succession of identical pinions and gears which will be described once only.

Each first pinion 5 has helical teeth so as to generate, from the driving force, a component of force in the axial direction opposite to the reaction of the axial thrust exerted by the screw to which the corresponding shaft 3, 4 is coupled.

With this arrangement, an axial thrust reaction of 150 kN produced by one screw is countered by an axial component of the driving force of the order of 100 kN, so that the residual axial force to be countered is only 50 kN.

Figure 3:
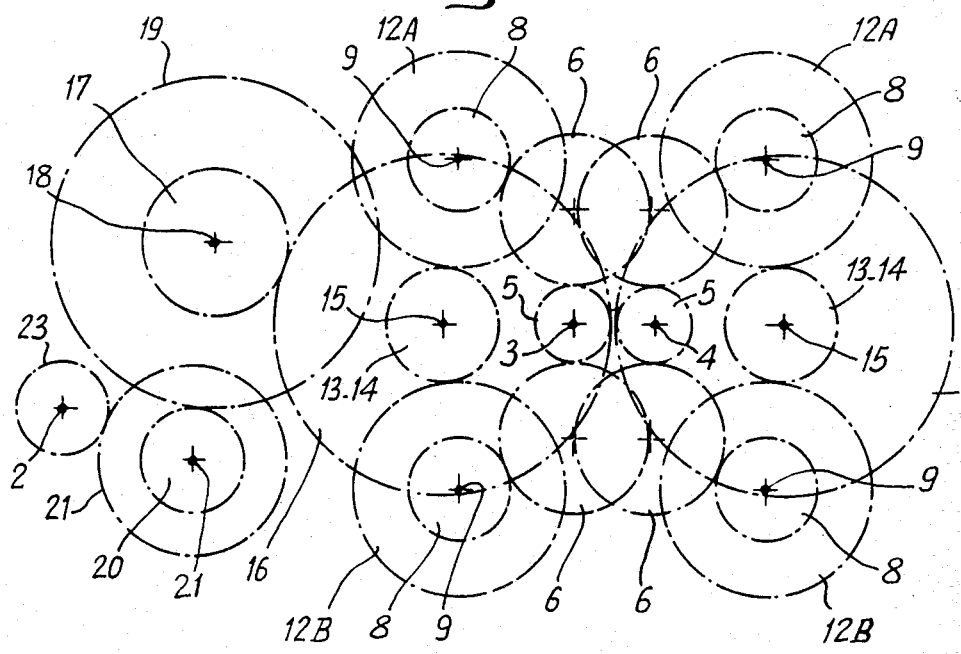
FIG. 3 is a schematic diagram showing to a smaller scale the actual layout of the gears within the casing of FIG. 1.
Figure 2:
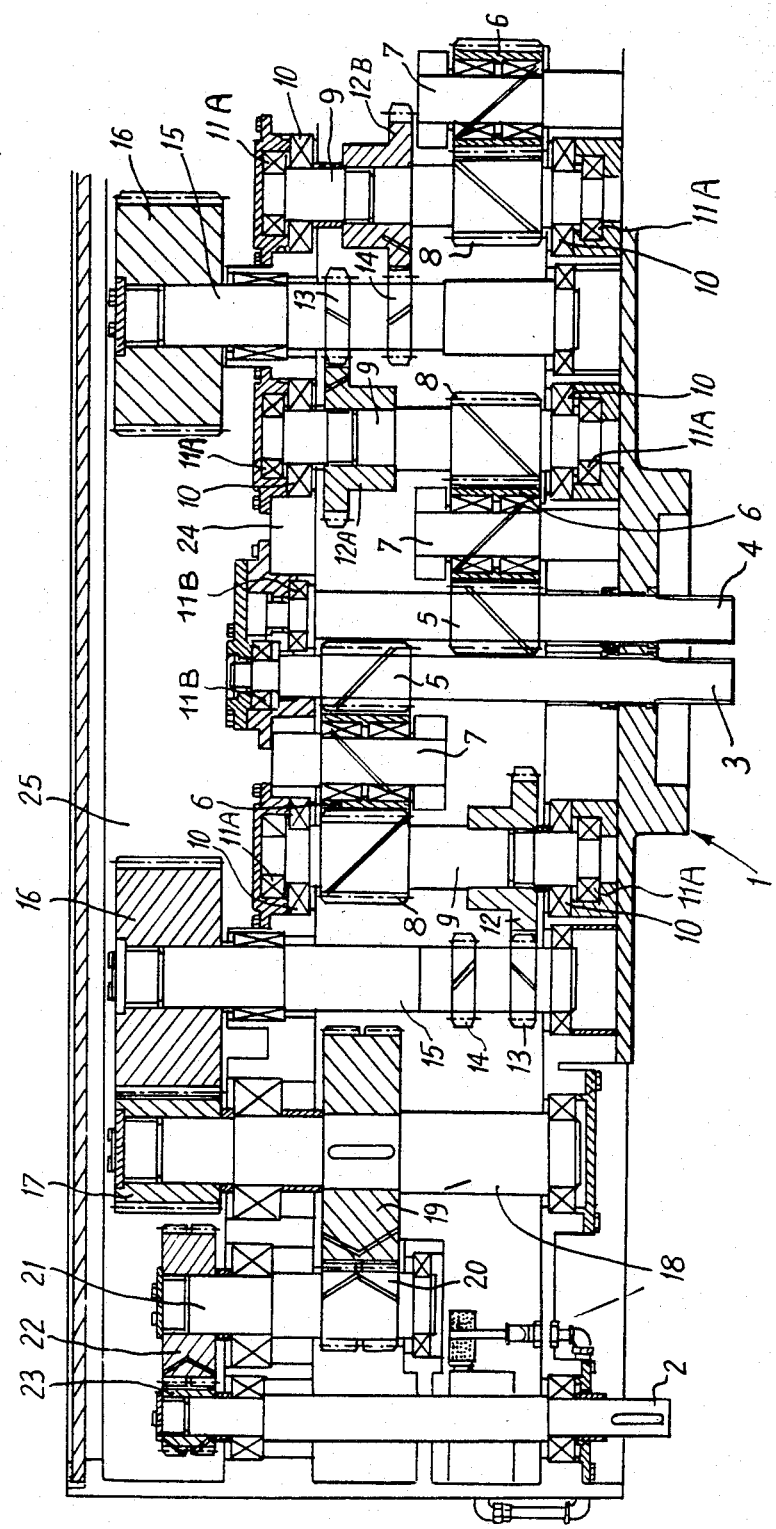
FIG. 2 is a plan view in cross-section of the reduction gear system of FIG. 1 projected onto a flat plane.

Each first pinion 5 meshes at diametrically opposite points, as seen in FIG. 3, with two first gears 6. The gears 6, of which there are four in all, do not interfere with one another since the first pinions 5 are offset in the axial direction as is shown in FIG. 2 in which, on the other hand, their arrangement in diametrically opposed pairs relative to each pinion 5 cannot be seen. In FIG. 2, the second gear 6 associated with the first pinion 5 of the first output shaft 3 has not been shown, in order to clarify the diagram.

Each first gear 6 receives the residual axial force which the first pinion 5 transmits to it, but as each of these first gears 6 is mounted so as to be freely movable in the axial direction, by means of an intermediate shaft 7, it in turn transmits this axial force to a second pinion 8 with which it meshes. Each second pinion 8 has teeth inclined in the same direction as the teeth of each first pinion 5 and is keyed to a thrust shaft 9. Thus there are in all four thrust shafts 9 each supported by two ball-bearings 10 and retained in the axial direction by two ball or roller thrust bearings 11A. In theory, the direction of the axial force transmitted to each thrust shaft 9 is known and a single thrust bearing may suffice.

The selected inclination of the teeth of the pinions 5, the gears 6 and the pinions 8 determines, dependent on the driving torque, the distribution of the axial load between the shafts 3, 4 coupled to the screws and the shafts 9. A high value of the inclination of the teeth distributes all or virtually all of the load to the shafts 9.

A lower value of the inclination distributes part of the load to the output shafts 3, 4 and the remainder to the shaft 9. Thus the facility provided by the invention for distributing the load makes it possible to select, according to the space available, thrust bearings 11A for the shafts 9 and thrust bearings 11B for the output shafts 3, 4 which are capable of supporting the axial loads to which they are subjected throughout the required duration of operation. The load is distributed dynamically when the machine is in operation and the distribution does not change. In practice, as a result of necessary clearances and manufacturing defects, not to mention fluctuations in the resistance to which the screws are subjected, the thrust shafts 9 may be subjected to slight movement in the axial direction, as a result of which it is preferable to provide thrust bearings 11A at both ends. One advantage of the invention is that it provides for the use of commercially available thrust bearings. To each thrust shaft 9 there is also keyed a second helical gear 12A, 12B. On one thrust shaft 9 the second gear 12A has teeth inclined in the opposite direction to the teeth of the second pinion 9, whereas on the other thrust shaft 9 the second gear 12B has teeth inclined in the same direction as those of the second pinion 8 which corresponds to it.

Each of the two gears 12 meshes with a respective third pinion 13, 14 and the two third pinions 13, 14 are fixed to a common shaft 15. They necessarily have teeth inclined in opposite directions. Consequently, the axial forces transmitted to each shaft 15 by the two pinions 13, 14 which it carries cancel out. Each of the shafts 15 may be mounted floating in the axial direction such that it always occupies an equilibrium position resulting from the equality of the axial forces acting on it. The balancing of these axial loads ensures correct distribution of the power to be transmitted between the two second gears, and thus between the two second pinions and the two first gears. Thus in spite of manufacturing tolerances and any machining defects, it is certain that:

the power required to be fed to each of the screws is correctly distributed between the two meshes on each first pinion, and the tangential and radial loads at these meshing points cancel out completely by virtue of the diametrically opposed relationship of the two first gears, thus eliminating bending and reaction forces on the bearings. Thus these bearings have only a guiding function, not being subjected to any load. The aforementioned equality results in equal tangential forces on the teeth and thus exact distribution of the powers (or torques) between the gears 12A, 12B, 9 and 6.

The equality of the torque exerted on the gears 6 results in equal and opposite tangential and radial forces in view of the diametrically opposed relationship of the gears 6 to the pinions 5. As these forces cancel out, the bearings supporting the shafts 3 and 4 on which the pinions 5 are mounted are not subject to any bending force and serve only to guide the shafts, their dimensions being correspondingly reduced so that they fit into the limited space available.

Each shaft 15 extends within the casing 1 beyond the shafts 3, 4 and 9 and carries a third gear 16 which has straight teeth.

In the case of counter-rotating screws and consequently output shaft 3, 4, the two third gears 16 each associated with a respective one of these shafts 3, 4 mesh together and one of them meshes with a pinion 17 carried by a shaft 18. The latter carries a gear 19 which meshes with a pinion 20 keyed to an intermediate shaft 21; the latter further carries a gear 22 which meshes with a pinion 23 keyed to the input shaft 2. The pinions 17, 20, 23, the gears 19, 22 and the parallel shafts 2, 21, 18 constitute a conventional reduction gear train which reduces the speed of the motor coupled to the input shaft 2 to a value appropriate to driving the third gears 16.

Figure 4:
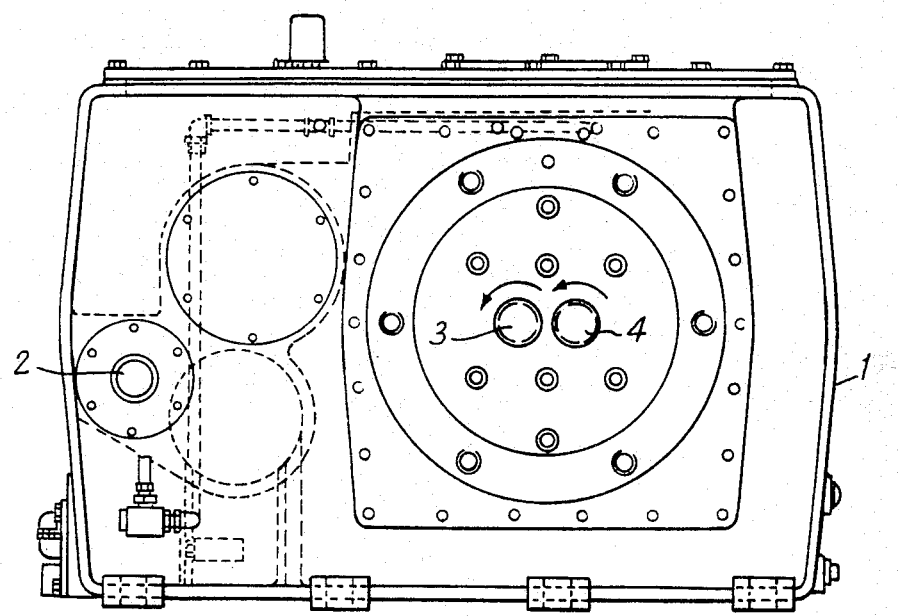
FIGS. 4 and 5 are views analogous to FIGS. 1 and 3 relating to the case where the screws turn in the same direction.
Figure 5:
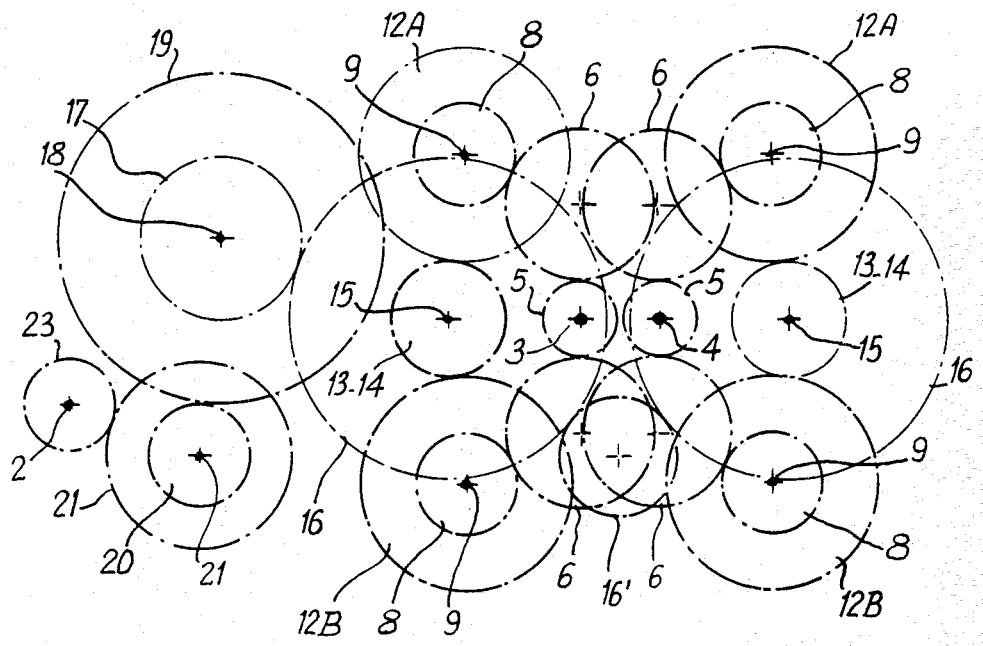

In the case of screws which turn in the same direction, two third gears 16 of smaller diameter are used (FIGS. 4 and 5) and both mesh with a common intermediate gear 16′ which is housed without difficulty in the casing 1. A single gear 16 meshes with the pinion 17 which is the final drive pinion of the reduction gear train described above. Other, equivalent means could be employed between the reduction part and the extrusion screw transmission part.

It follows from the foregoing that, in a reduction gear system in accordance with the invention, the shafts coupled to the screws are not subject to any bending; the bearings which support them are not loaded since they are driven at two diametrically opposite points and the power to be transmitted is perfectly distributed between these two points. Also, the thrust loads are transferred to the thrust shafts with reduced value and to shafts which are sufficiently far apart for each to be provided with a single thrust bearing capable of withstanding the entire thrust.

Note that in a reduction gear system in accordance with the invention, except for the shafts 7 which are very short, all the shafts are supported by a first wall of the casing 1 and by an internal partition wall 24. The latter forms with the opposite second wall of the casing a space 25. The two third gears 16 and the final pinion 17 of the reduction gear train are disposed in this space 25 which provides the room necessary for adapting the reduction gear system to extruding machine screws rotating in the same direction or in opposite directions, as previously explained. This arrangement also facilitates adjustment of the relative angular positions of the screw shafts 3 and 4, by the appropriate offsetting and angular positioning of one of the gears 16.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. In a twin screw extruding machine, a reduction gear system comprising a casing, an input shaft, two output shafts supported by said casing, each in alignment with a respective one of said screws, a respective first pinion on each of said output shafts, said first pinions being offset relative to one another in the axial direction and said first pinion on a first of said output shafts being a helical pinion so as to develop a component of force in the axial direction opposite a reaction to the thrust exerted by the associated screw of the extruding machine, two first helical gears meshing with said first pinion on said first output shaft at diametrically opposite points thereon, a respective second helical pinion meshing with each of said first helical gears, a respective thrust shaft to which each of second helical pinions is keyed, a respective thrust bearing at one end at least of each of said thrust shafts, a respective second helical gear keyed to each of said thrust shafts, said second helical gear keyed to one of said thrust shafts having its teeth inclined in the direction opposite that of the teeth of said second helical pinion on said one thrust shaft and said second helical gear keyed to the other of said thrust shafts having its teeth inclined in the same direction as the teeth of said second helical pinion on said other thrust shaft, a respective third helical pinion meshing with each of said second helical gears, said third helical pinions having teeth inclined in opposite directions, a common shaft to which said third pinions are fixed, and a third gear keyed to said common shaft and adapted to be driven by said input shaft.

2. In a twin screw extruding machine, a reduction gear system comprising a casing, an input shaft, two output shafts supported by said casing, each in alignment with a respective one of said screws, a respective first pinion on each of said output shafts, said first pinions being offset relative to one another in the axial direction and said first pinion on each of said output shafts being a helical pinion so as to develop a component of force in the axial direction opposite a reaction to the thrust exerted by the associated screw of the extruding machine, two first helical gears meshing with said first pinion on each of said output shafts at diametrically opposite points thereon, a respective second helical pinion meshing with each of said first helical gears, a respective thrust shaft to which each of second helical pinions is keyed, a respective thrust bearing at one end at least of each of said thrust surface, a respective second helical gear keyed to each of said thrust shafts, said second helical gear keyed to one of said thrust shafts having its teeth inclined in the direction opposite that of the teeth of said second helical pinion on said one thrust shaft and said second helical gear keyed to the other of said thrust shafts having its teeth inclined in the same direction as the teeth of said second helical pinion on said other thrust shaft, a respective third helical pinion meshing with each of said second helical gears, said third helical pinions having teeth inclined in opposite directions, a common shaft to which said third pinions are fixed, and a third gear keyed to said common shaft, said third helical gears being adapted to be driven by said input shaft.

3. The machine of claim 1, wherein said reduction gear system further comprises a thrust bearing at one end of said first output shaft and wherein the inclination of the teeth of said first, second and third helical pinions and of said first and second helical gears is such as to distribute the total axial load between said thrust bearing associated with said first output shaft and said thrust bearings associated with said thrust shafts.

4. The machine of claim 2, wherein said reduction gear system further comprises a respective thrust bearing at one end of each of said output shafts and wherein the inclination of the teeth of said first, second and third helical pinions and of said first and second helical gears is such as to distribute the total axial load between said thrust bearings associated with said output shafts and said thrust bearings associated with said thrust shafts.

5. The machine of claim 2, wherein said screws are adapted to rotate in opposite directions, wherein said reduction gear system further comprises a helical final drive pinion and a reduction gear train linking said final drive pinion to said input shaft, and wherein said third helical gears mesh with one another and with said helical final drive pinion.

6. The machine of claim 2, wherein said screws are adapted to rotate in the same direction, wherein said reduction gear system further comprises a supplementary helical gear, a helical final drive pinion and a reduction gear train linking said final drive pinion to said input shaft, and wherein said third helical gears mesh with said supplementary helical gear and one of said third helical gears meshes with said helical final drive pinion.

7. The machine of claim 2, wherein said casing of said reduction gear system comprises first and second walls and an internal partition wall, wherein said output shafts, said thrust shafts and said shafts carrying said third helical pinions and said third helical gears are supported by said first wall and said internal partition wall, and wherein said third helical gears are disposed between said internal partition wall and said second wall.

8. The machine of claim 2, wherein said reduction gear system further comprises a respective thrust bearing at each end of each of said thrust shafts.

* * * * *